March 1, 1966  A. R. POSPISCHIL  3,237,549
COMBINED SERVER AND KEEPER
Filed Nov. 26, 1963
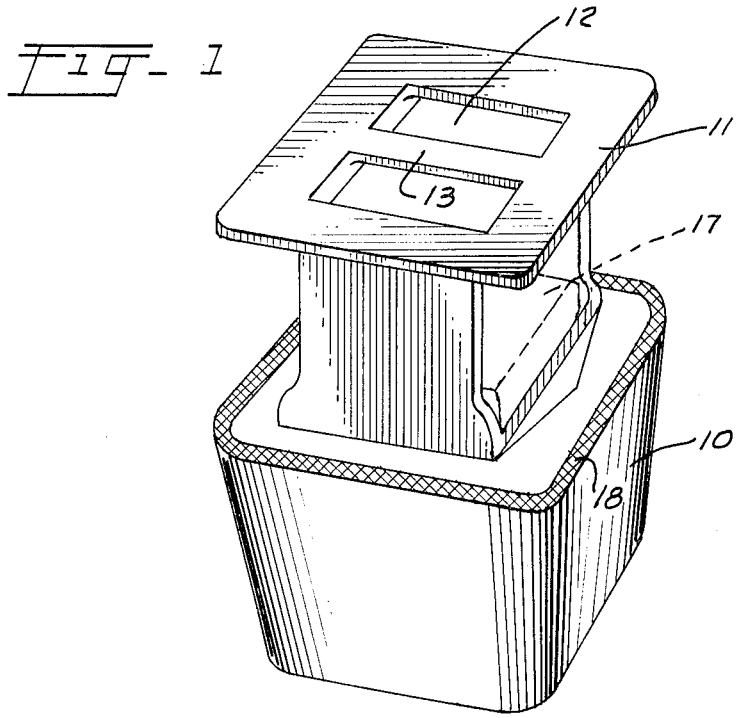
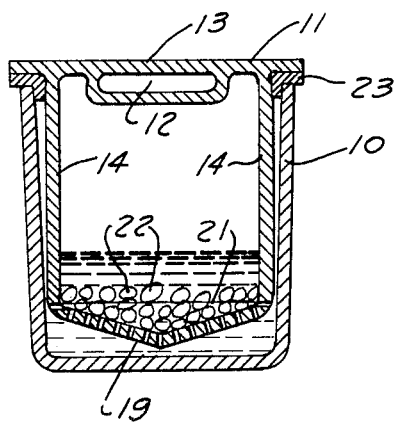
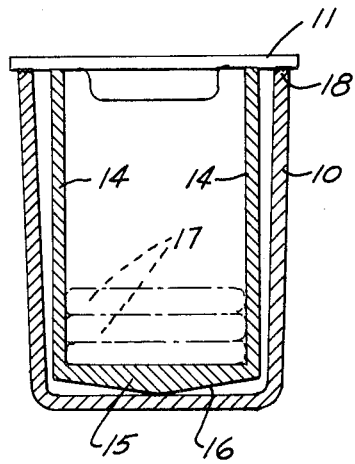
INVENTOR.
ALBERT R. POSPISCHIL
BY
ATTORNEYS

United States Patent Office 3,237,549
Patented Mar. 1, 1966

3,237,549
COMBINED SERVER AND KEEPER
Albert R. Pospischil, % Precision Fabricators,
200 Oak Grove, South Beloit, Ill.
Filed Nov. 26, 1963, Ser. No. 326,071
3 Claims. (Cl. 99—269)

This invention relates to a combination server and keeper and more particularly to a device for retaining and serving food products such as sliced bread, sandwiches, pickles, olives and the like. Specifically the invention relates to a means for storing and serving such food products in a sanitary, self sealing container designed to prevent accidental exposure of the server contents to air borne contamination, drying or unnecessary human handling.

Food products such as sliced bread, sandwiches, olives, pickles, or the like, have heretofore normally been stored in their original containers or in wrappings from which they are removed to be served in or on uncovered receptacles that exposed said items to the harmful effects of the atmosphere, or in covered containers that are difficult at best to serve. Not only are these methods of storing and serving troublesome but they have necessarily resulted in waste due to drying or contamination of the products.

It is accordingly the principal object of the present invention to provide a combination server and keeper which will be self sealing, thus preventing any unnecessary exposure of the said contents to air or human borne contamination, and from which the products may easily be served.

Another object is to provide a combined server and keeper which will protect its contents from damage due to accidentally spilled liquids or solids, such as ketchup or sugar.

A further object of the present invention is to provide a combined server and keeper which will maintain the thermal state of said stored items for a longer period than could be maintained by other convenient means.

It is a further object to provide a combined server and keeper which will permit a controlled ingress and egress of the atmosphere to the container to retard the growth of mold spores or the collection of condensate within said container when the container is used for sliced bread, sandwiches, or the like.

A still further object is to provide a combination self draining serving tray and container cover for storage and serving of olives, pickles, or the like, that require their being immersed in a liquid for proper storage.

The above and other objects and features of the invention will be more readily apparent from the following description when read in connection with the accompanying drawing, in which:

FIG. 1 is an exploded view illustrating one embodiment of the invention;

FIG. 2 is a central section view of FIG. 1;

FIG. 3 is a view similar to FIG. 2 of an alternative construction.

The combined server and keeper, as shown in FIG. 1, comprises an open topped container 10 which may be formed of plastic or metal, as desired. While the container is shown as being of generally rectangular shape, it will also be apparent that this shape could be altered, as desired.

The top of the container is adapted to be closed by a cover member having a flat upper portion 11 of a size to fit over the upper edge of the container 10 and of a configuration corresponding to that of the container 10. For convenience of handling, the upper surface of the cover 11 is preferably recessed, as indicated at 12, and a bar 13 extends across the recess and is spaced above the bottom thereof to be gripped by the fingers to facilitate handling of the cover. The cover carries a depending supporting structure including spaced side members 14 which may be integrally molded with the cover itself or which may be attached thereto in any desired manner. The side members are connected by a bottom member 15 which preferably has a flat upper surface and whose lower surface is preferably rounded or V-shaped, as shown at 16, so that the supporting member will not rest solidly on a table or other surface. Due to this configuration the user is reminded to reinsert the supporting structure in the container so that articles carried by the supporting structure will not be left out to become dry.

The combined server and keeper, as shown in FIGS. 1 and 2, is adapted to contain articles such as sandwiches, indicated in dotted lines at 17 in FIGS. 1 and 2. These articles will rest on the bottom member 10 between the sides 14 and when the supporting structure and cover are placed in the receptacle, as shown in FIG. 2, will be enclosed and protected. With articles of this sort it is desirable that the container not be completely closed, but be permitted to breathe. For this purpose, the upper edge portion of the container is roughened, as by knurling or the like, as indicated at 18, to permit limited ingress and egress of the air. The knurling may extend completely around the rim of the container or throughout only a portion thereof, as desired, but I have found that in practice at least 25% of the rim area should be so knurled for most effective preservation of the articles in the container. This knurling will permit ingress and egress of air and will also provide a narrow non-linear path for the air so that it will act as a filter to prevent entrance of air borne particles when the cover is in its closed position.

The combined server and keeper, as shown in FIGS. 1 and 2 and as so far described, is very effective for storing and serving of sandwiches, bread, various types of hors d'oeuvres, and similar materials.

For storing and serving other types of materials, such as olives, pickles, and the like, which are desirably stored in a liquid, the construction may be modified as shown in FIG. 3 wherein like parts are indicated by the same reference numerals as in FIGS. 1 and 2. In this construction, the container 10 may be the same as in FIGS. 1 and 2 and the cover 11 with its handle member 13 and recessed upper surface 12 may also be the same. The supporting structure is again formed by spaced side members 14, but the bottom in this case is of substantially uniform thickness and is concave at its upper surface, as shown at 19. Preferably there are short end members 21 which partially enclose the ends of the bottom between the side members 14 to retain articles in place on the bottom, as indicated at 22. Also, the bottom and preferably the end members are perforated, as illustrated in FIG. 3, so that liquid will not be held thereon.

In the case of articles, such as olives or pickles, stored in liquid, it is desirable to seal the container. For this purpose a sealing strip or ring 23 formed of a relatively soft sealing material, such as rubber, or a soft plastic material is carried by the cover to seal against the upper edge portion of the container. The container can thus be used for storing the articles under refrigeration without any drying out thereof and for serving the articles. It will be apparent that for serving the cover handle is grasped and the cover and supporting structure are removed from the container with the liquid draining back into the container during the removal operation. The articles can thus easily be removed from the supporting structure, as desired.

While two embodiments of the invention have been shown and described herein, it will be understood that they are illustrative only and not to be taken as a definition of the scope of the invention, reference being had for this purpose to the appended claims.

What is claimed is:

1. A combined server and keeper comprising an open topped receptacle, a cover for the open top of the receptacle, a supporting structure for articles to be served depending from the cover into the receptacle, the supporting structure including a bottom to support the articles and oppositely disposed side members suspending the bottom from the cover in spaced relationship thereto, the supporting structure being open on the sides between said side members for ready access to articles supported on the bottom.

2. The combined server and keeper of claim 1 in which the lower surface of the bottom is downwardly convex so that the supporting structure will not rest solidly on a flat horizontal surface.

3. The combined server and keeper of claim 1 in which the lower surface of the cover rests on the upper surface of the container side walls and one of said surfaces is knurled throughout at least 25% of the mating area to provide for restricted ingress and egress of air while preventing ingress of foreign material.

References Cited by the Examiner

UNITED STATES PATENTS

| | | | |
|---|---|---|---|
| 473,400 | 4/1892 | Lewis | 99—403 |
| 751,640 | 2/1904 | Hayes | 99—403 X |
| 1,625,999 | 4/1927 | Irish | 99—403 |
| 2,624,451 | 1/1953 | Ewing | 312—236 X |
| 2,919,169 | 12/1959 | Jackson | 312—235 |

CHARLES A. WILLMUTH, *Primary Examiner.*

ROBERT E. PULFREY, *Examiner.*